(12) United States Patent
Kirkman

(10) Patent No.: US 6,462,459 B1
(45) Date of Patent: Oct. 8, 2002

(54) GENERATOR/ALTERNATOR REMANUFACTURING KIT APPARATUS

(75) Inventor: Robert E. Kirkman, Northville, MI (US)

(73) Assignee: Kirk's Automotive, Inc., Detroit, MI (US)

( * ) Notice: Subject to any disclaimer, the term of this patent is extended or adjusted under 35 U.S.C. 154(b) by 0 days.

(21) Appl. No.: 09/596,989

(22) Filed: Jun. 20, 2000

Related U.S. Application Data

(60) Provisional application No. 60/142,169, filed on Jul. 1, 1999.

(51) Int. Cl.$^7$ .................... H02K 1/00; B65B 3/02; B65B 1/04; B65B 23/00; B65D 81/02
(52) U.S. Cl. .................... 310/273; 53/458; 53/235; 53/255; 53/472; 53/246; 206/319; 206/589
(58) Field of Search .................... 310/42, 46, 48, 310/66, 67 R, 68 D, 273; 322/1, 12; 53/452, 458, 467, 50, 235, 238, 246, 255, 319, 285, 377.6, 203

(56) References Cited

U.S. PATENT DOCUMENTS

| | | | | |
|---|---|---|---|---|
| 3,904,030 A | * | 9/1975 | Repp et al. ............ 206/319 |
| 4,167,695 A | * | 9/1979 | Phillips ............ 322/12 |
| 4,174,036 A | * | 11/1979 | Beckman et al. ........... 206/223 |
| 4,362,065 A | * | 12/1982 | Baratti ............ 74/7 A |
| 4,497,630 A | * | 2/1985 | Oliver ............ 434/224 |
| 4,507,566 A | * | 3/1985 | Leatherman et al. ...... 290/38 R |
| 6,137,194 A | * | 10/2000 | Haugseth ............ 310/1 |
| 6,223,504 B1 | * | 5/2001 | Minor et al. ............ 53/441 |

OTHER PUBLICATIONS

Kirk's Automotive, Inc., Kirk's® Module™ Generator Kits product brochure, Oct. 1996.

\* cited by examiner

*Primary Examiner*—Nicholas Ponomarenko
*Assistant Examiner*—Dang Dinh Le
(74) *Attorney, Agent, or Firm*—Fish & Richardson P.C.

(57) ABSTRACT

In accordance with the teachings of the present invention, a remanufacturing kit that reduces the assembly functions and time required for remanufacturing a 50 DN generator is disclosed. The kit includes a box member, a pre-tested 50 DN generator subassembly, a rotor, an installation kit and an insert structure for securing the 50 DN generator subassembly, the rotor and the installation kit within the box member.

33 Claims, 7 Drawing Sheets

*44*

50DN Generator Test Report

Date:_____    W/O Number:_____

Kit & Rotor Serial Number:_____

| Test Results | 180° F |
|---|---|
| 1800 Generator RPM 165 amps @ 28VDC | 168 A |
| 3000 Generator RPM 250 amps @ 28VDC | 252A |
| 4000 Generator RPM 270 amps @ 28VDC | 273 A |

GENERATOR/ALTERNATOR REMANUFACTURING KIT APPARATUS

CROSS REFERENCE TO RELATED APPLICATION

This application claims benefit of Provisional Application Serial No. 60/142,169 filed Jul. 1, 1999.

BACKGROUND OF THE INVENTION

1. Technical Field

This invention relates to remanufacturing kits and, more particularly, to a remanufacturing kit for use in remanufacturing 50 DN generators/alternators that produce a direct current (DC) output for use in conjunction with bus or coach vehicle systems.

2. Discussion of the Related Art

The use of piece part kits for remanufacturing 50 DN generators/alternators is generally known in the art. Transit bus and coach vehicles commonly utilize 50 DN generators that produce a direct current (DC) output to meet the electrical demands of the vehicles. Once a 50 DN generator fails, the generator can often be remanufactured to its original specifications. Individuals remanufacturing a 50 DN generator commonly use kits containing piece parts such as bearings, insulators, diodes, leads, terminals, seals, o-rings, screws, nuts and other miscellaneous piece parts requiring replacement during the remanufacturing process of the 50 DN generator. Such piece parts are typically packaged for ease of use by the individual remanufacturing a 50 DN generator. Unfortunately, a problem that exists with such piece part kits is that the number of piece parts is typically numerous which in turn increases the functions and labor time required to remanufacture a 50 DN generator. Another problem with piece part kits is that the individual piece parts are not sub-assembled or pre-tested as a subassembly to reduce assembly time and ensure that the resulting remanufactured 50 DN generator meets minimum electrical output specifications.

It is therefore desirable to provide a 50 DN remanufacturing kit that reduces the functions and labor time required to remanufacture a 50 DN generator.

More particularly, it is desirable to provide a 50 DN remanufacturing kit with a pre-assembled subassembly that is pre-tested to ensure that the resulting remanufactured 50 DN generator meets minimum electrical output specifications.

It is further desirable to provide a 50 DN remanufacturing kit that includes a pre-assembled subassembly and other components in a single package with a test sheet providing actual output results for increasing remanufacturing efficiency.

SUMMARY OF THE INVENTION

In accordance with the teachings of the present invention, a 50 DN generator remanufacturing kit that decreases the functions and labor time required to remanufacture a 50 DN generator is disclosed. The kit includes a box member, a 50 DN generator subassembly, and an insert structure for securing the 50 DN generator subassembly within the box member.

In accordance with the teachings of one embodiment of the present invention, the kit includes a rotor and an installation kit that is secured by the insert structure within the box member.

In accordance with a preferred embodiment, the insert structure includes a lower insert member disposed transversely across a lower section of the box member and includes apertures for receiving the installation kit, the rotor and the 50 DN generator subassembly. The insert structure includes an upper insert member disposed transversely across an upper section of the box member and includes apertures for receiving the rotor and the 50 DN generator subassembly for ease of use and handling.

In accordance with another preferred embodiment, the kit includes a pre-tested 50 DN generator subassembly including a diode end housing assembly, a stator coupled to the diode end housing assembly, and a field coil disposed within the stator and coupled to the diode end housing assembly.

In accordance with another preferred embodiment, the kit includes a test sheet indicating actual electrical output results from the 50 DN generator subassembly tested with the rotor.

BRIEF DESCRIPTION OF THE DRAWINGS

The various advantages of the present invention will become apparent to those skilled in the art after reading the following specification and by reference to the drawings in which:

FIG. 10 is a top view of a test sheet providing actual output results of the generator sub-assembly tested with a rotor of the kit in accordance with the present invention.

DETAILED DESCRIPTION OF THE PREFERRED EMBODIMENTS

The following description of the preferred embodiments is merely exemplary in nature and is in no way intended to limit the invention or its application or uses.

The present invention is particularly concerned with providing a remanufacturing kit apparatus that reduces the number of assembly functions and labor time required to remanufacture a 50 DN generator. The remanufacturing kit is designed for ease of use and handling such that the resulting remanufactured 50 DN generator meets minimum electrical output specifications. The present invention is applicable for both gear and belt driven 50 DN generators such as, but not limited to, Delco Remy part number 1117850.

Figure 1:
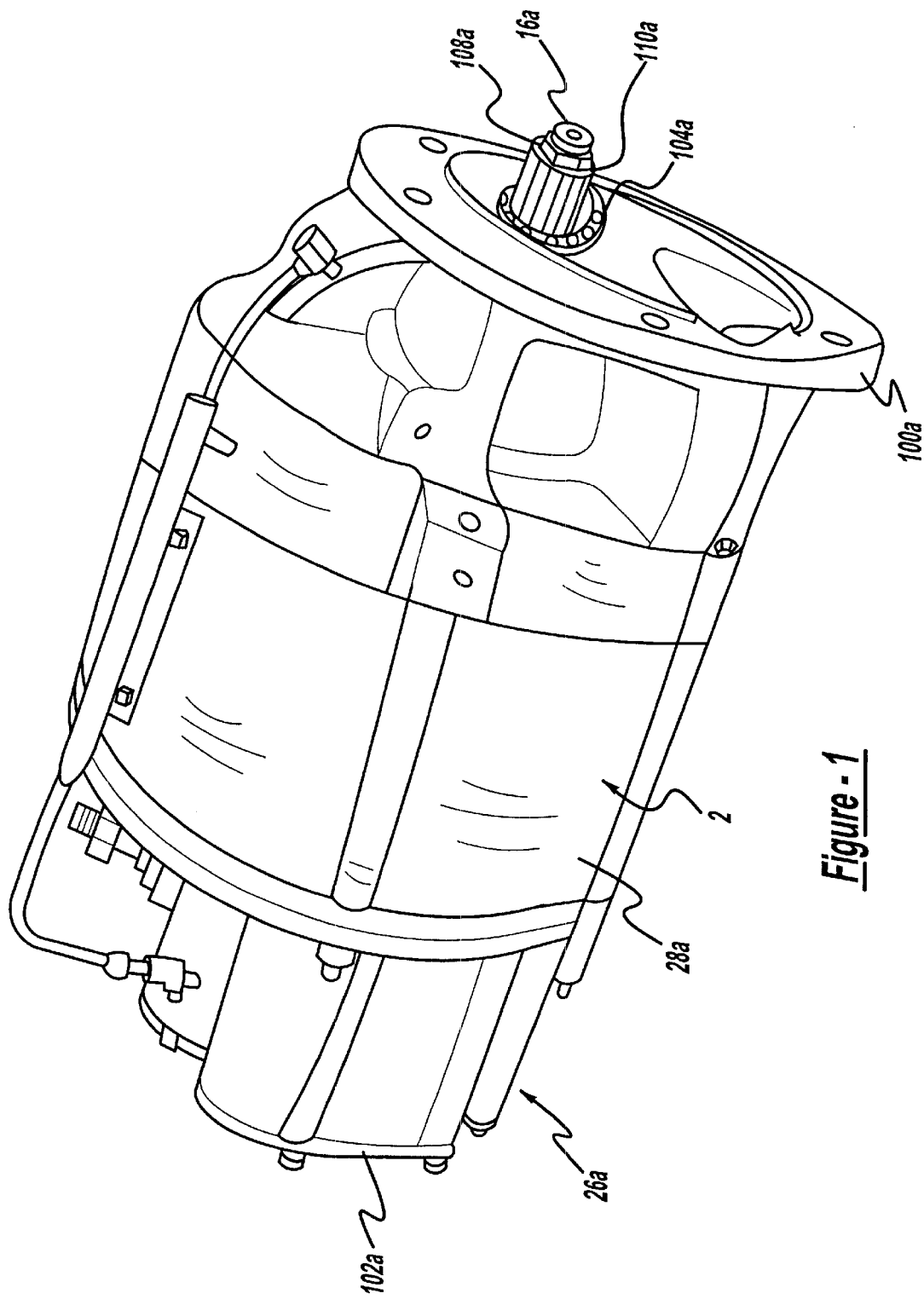
FIG. 1 is a perspective view of a remanufactured 50 DN generator.

FIG. 1 is a perspective view of a typical remanufactured 50 DN generator 2 that is ready for use in a bus or coach vehicle application. The original equipment manufacturer for a new 50 DN generator is Delco Remy International, Inc. As will be apparent to one skilled in the art, the 50 DN generator is fully remanufactured with all necessary parts. For example and reference, the generator 2 includes a rotor 16a, a hex nut 108a, a shaft washer 110a, a diode end housing assembly 26a, a drive end frame 100a, a roller bearing 104a, and a diode end housing end cover 102a.

Figure 2:
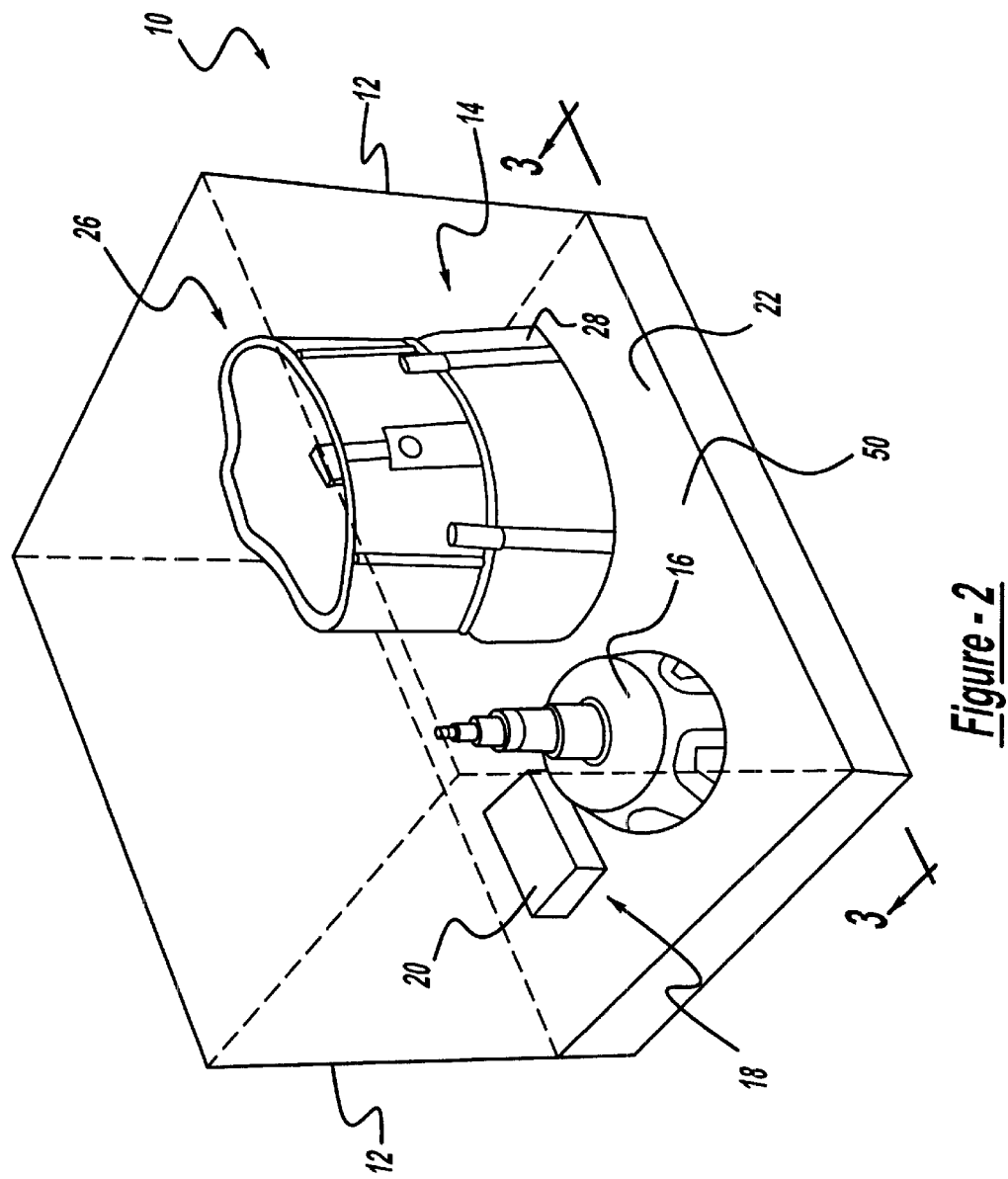
FIG. 2 is a cut away perspective view of the 50 DN remanufacturing kit with an upper insert member removed in accordance with the teachings of the present invention.

Turning to FIG. 2, a cut away perspective view of a 50 DN remanufacturing kit 10 is illustrated. The kit 10 includes a box member 12 that encapsulates the kit 10 to protect its contents during shipping and handling. The kit 10 includes a pre-tested 50 DN generator subassembly 14, a 50 DN rotor 16, and an installation kit 18 that includes an installation box member 20. The kit 10 further includes a lower insert member 22 and an upper insert member 24 that is not shown but is illustrated in FIG. 3 and FIG. 4 in detail.

Figure 5:
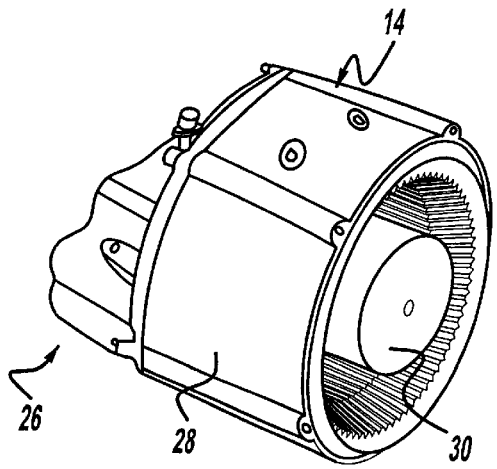
FIG. 5 is a perspective view of a 50 DN generator subassembly in accordance with the present invention.
Figure 6:
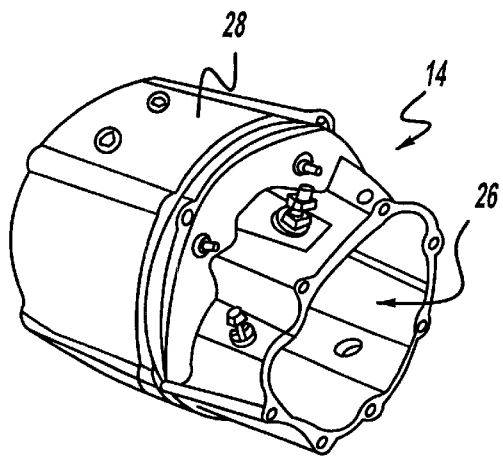
FIG. 6 is another perspective view of a 50 DN generator subassembly in accordance with the present invention.
Figure 8:
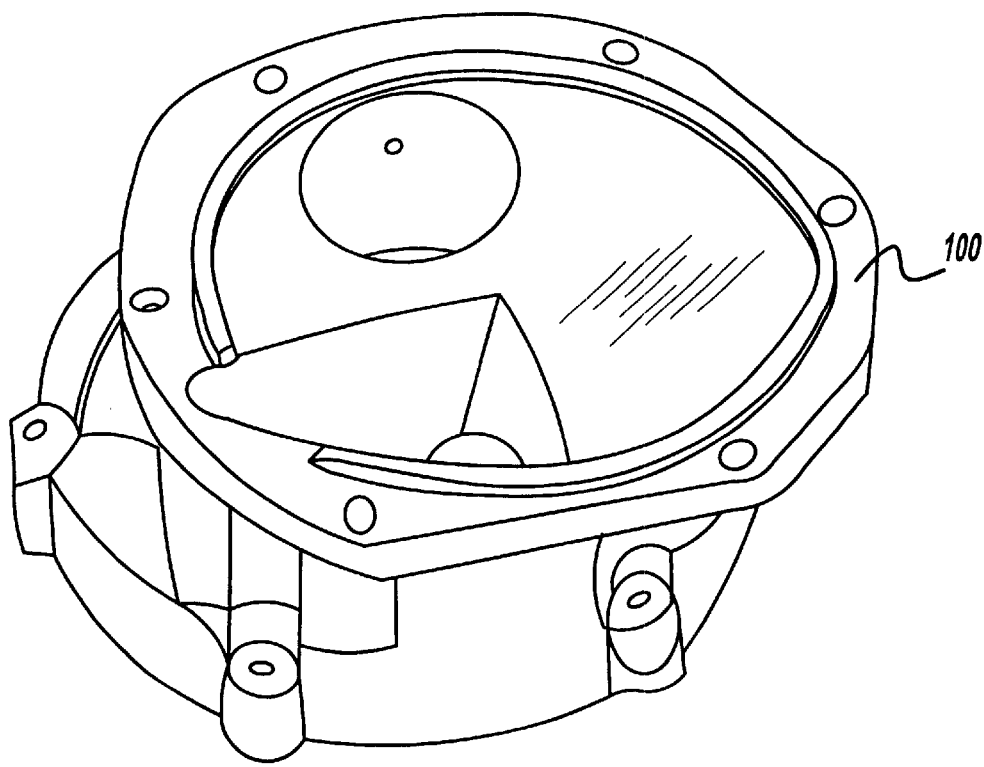
FIG. 8 is a perspective view of a drive end frame that is utilized for pre-testing the generator sub-assembly in accordance with the present invention.
Figure 9:
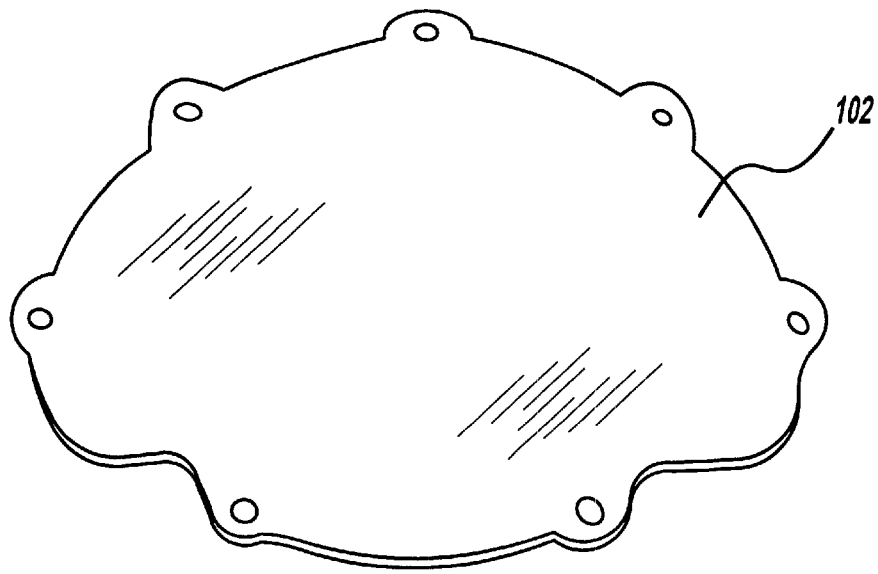
FIG. 9 is a perspective view of a diode housing end cover that is utilized for pre-testing the generator sub-assembly in accordance with the present invention.

Referring to FIGS. 5 and 6, the generator subassembly 14 includes a diode end housing assembly 26, a stator 28 coupled to the diode end housing assembly 26, and a field coil 30 disposed within the stator 28 and coupled to the diode housing assembly 26. Internally, the diode end housing assembly 26 includes all of the rectifier components included in a rectifier for a typical 50 DN generator including studs, rectifier brackets, diodes, insulators, terminals, nuts, leads, and washers such that the assembly 14 is electrically functional. The generator subassembly 14 is assembled such that it is pre-tested mechanically and electrically in conjunction with the rotor 16 to ensure that the resulting remanufactured 50 DN generator meets minimum electrical output specifications. As shown in FIGS. 8 and 9, a gear driven 50 DN drive end frame 100 with associated bearings (not shown) and a diode housing end cover 102 are utilized in conjunction with a Transit-Tech 1000 test stand manufactured by Kirk's Automotive, Inc. of Detroit Mich., or any other suitable generator or alternator tester. The subassembly 14 is tested by mechanically rotating the rotor 16 within the stator 28 and around the field coil 30, in a normal assembled position, to measure the electrical output of the generator subassembly 14. Such a test is important because the particular combination of the rotor 16, the stator 28, and the field coil 30 is critical to assure proper electrical output of the resulting 50 DN generator.

Figure 7:
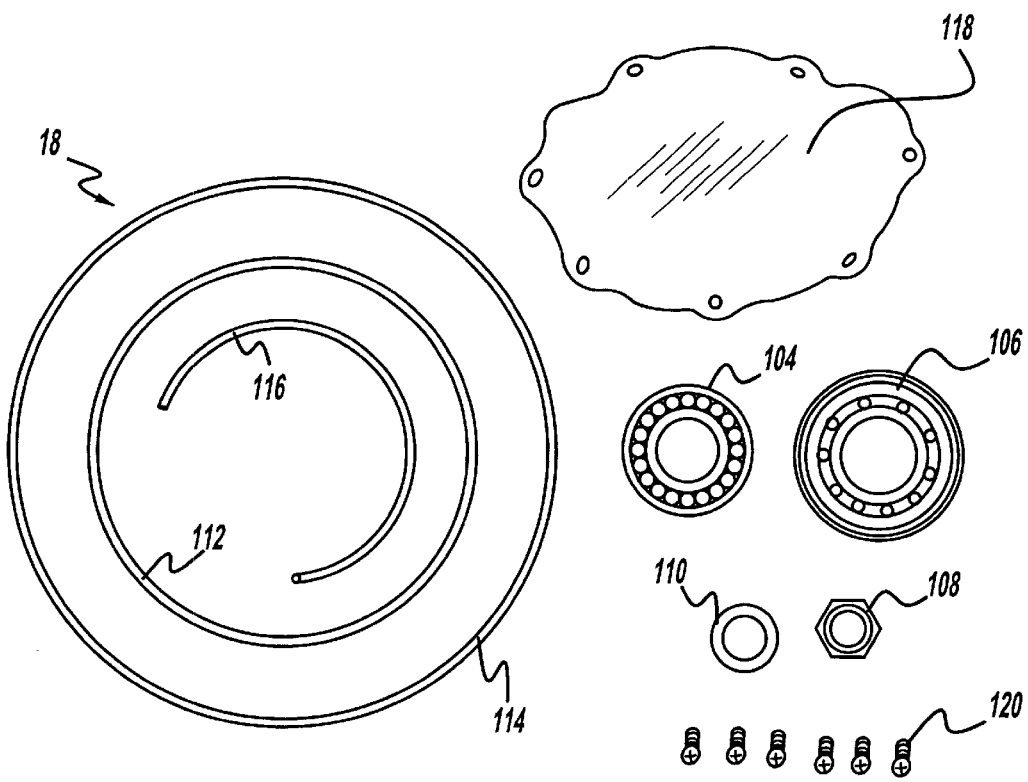
FIG. 7 is a top view of an installation kit in accordance with the present invention.

Turning to FIG. 7, the installation kit 18 includes piece parts that an individual uses to assemble the 50 DN generator subassembly 14 resulting in a remanufactured 50 DN generator. In accordance with a preferred embodiment, the installation kit 18 includes parts for remanufacturing a 50 DN generator including a roller bearing 104, a ball bearing 106, a hex nut 108, a shaft washer 110, two silicone o-rings 112 and 114 for use with the stator 28, o-ring material 116 for a drive end frame, a diode housing end cover gasket 118, and six screws 120 for a drive end frame. Preferably, the roller bearing 104 is a Torrington part number AP57252, the ball bearing 106 is a BCA part umber 209S, the hex nut 108 is an AC Delco part number 9418942, the washer 110 s a part number 1911116, the two silicone o-rings 112 and 114 are Zatkoff part numbers 2-261 S and 2-269S570, the o-ring material 116 is a Zatkoff part number 3/32-103-OD, the diode housing end cover gasket 118 is an AC Delco part number 1976514, and the six screws 120 are ¼-20x⅝ philip screws. One skilled in the art will realize that the contents of the installation kit 18 can be increased or decreased without departing from the scope of the present invention. For example, additional screws or lock washers for attaching a diode end housing cover may be added depending upon a particular application.

Figure 3:
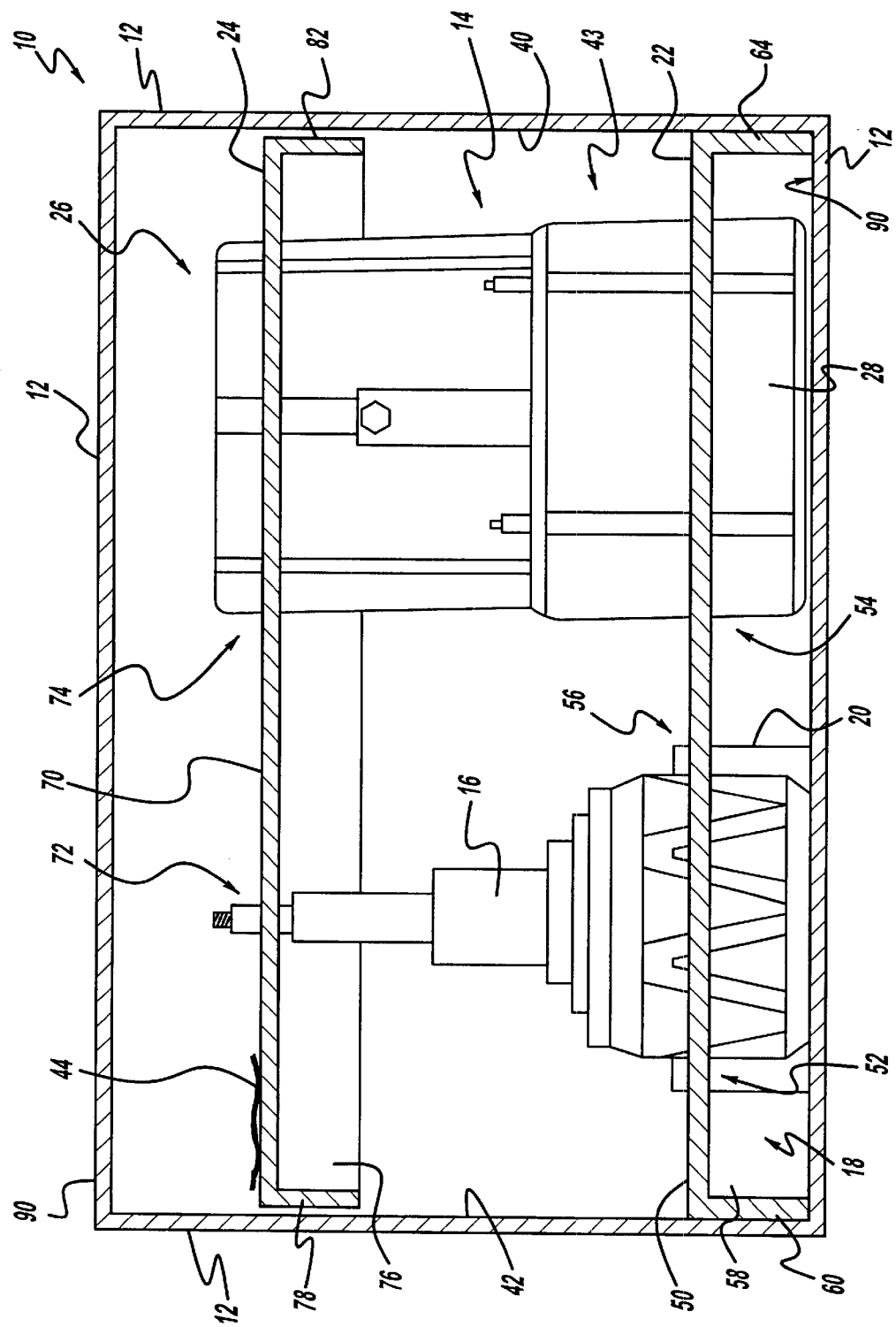
FIG. 3 is a side view of the 50 DN remanufacturing kit along line 3—3 of FIG. 2 with an upper and a lower insert member securing the kit in accordance with the teachings of the present invention.
Figure 4:
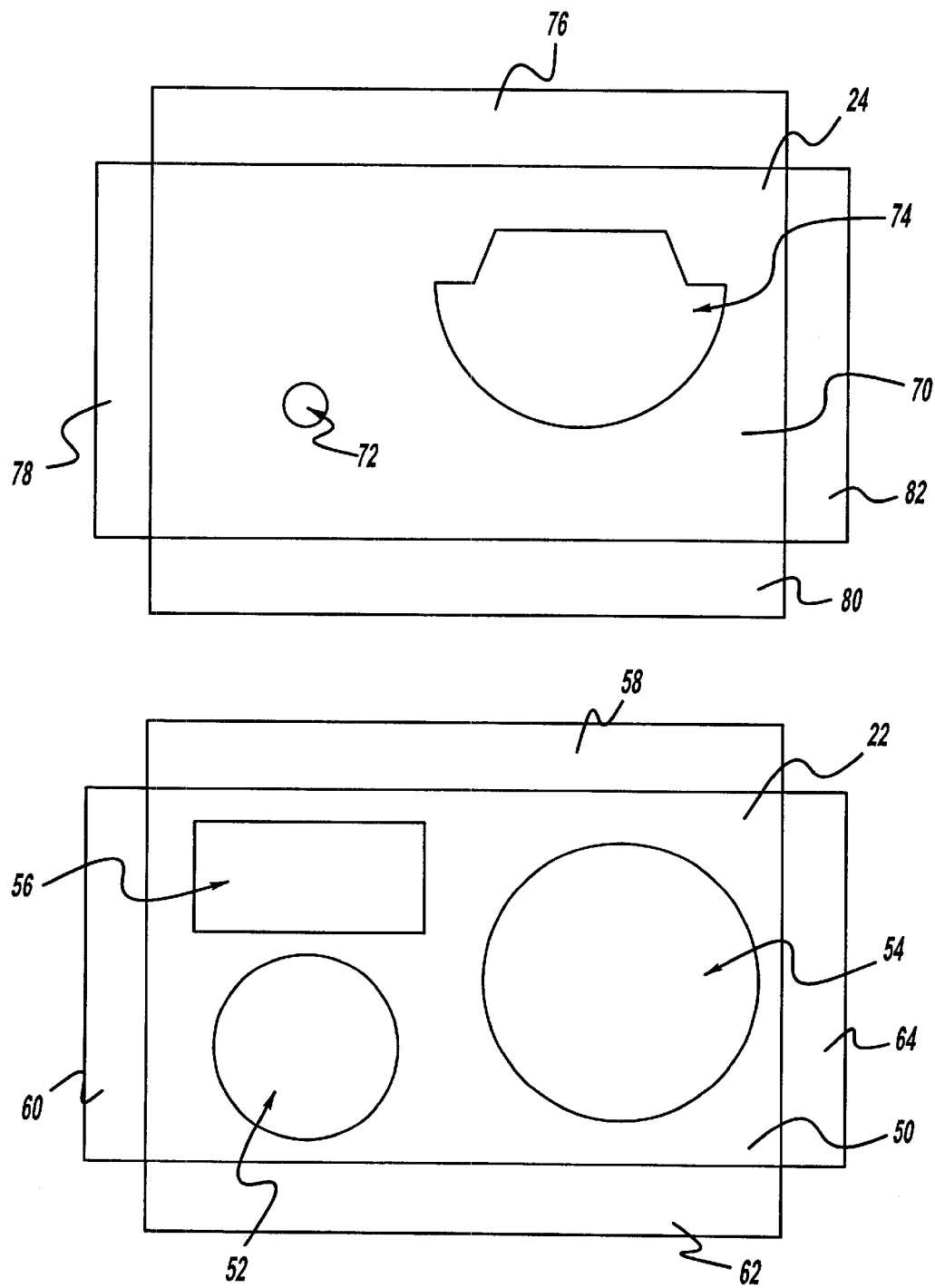
FIG. 4 is a top view of the upper and lower insert members of the 50 DN remanufacturing kit in accordance with the teachings of the present invention.

Turning to FIG. 3 a side view of the kit 10 along lines 3—3 of FIG. 2 is shown. In accordance with a preferred embodiment, the upper insert member 24 and lower insert member 22 are show securing the 50 DN generator subassembly 14, the rotor 16, and the installation kit 18 via the installation box member 20. The upper insert member 24 and lower insert member 22 are disposed and extend transversely across the box member 12 between inner surfaces 40 and 42. As illustrated, the upper insert member 24 is above the lower insert member 22 in respective upper and lower portions of the box member 12.

Also included within the kit 10 is a test sheet 44 that lists the actual electrical output results from the 50 DN generator subassembly 14 tested with the rotor 16. The minimum specifications are as follows:

| RPM | Amperage | Voltage (DC) | Oil Temperature (° F.) |
| --- | --- | --- | --- |
| 1800 | 165 | 28 | 180–220 |
| 3000 | 250 | 28 | 180–220 |
| 4000 | 270 | 28 | 180–220 |

Preferably, the test sheet 44 lists the actual amperage output of the 50 DN subassembly under these operating conditions, but the present invention is not limited to these conditions, and the test sheet 44 can provide other data results as needed for a particular application. The test sheet 44 is illustrated in FIG. 10.

Turning to FIG. 4, a top view of the lower insert member 22 and the upper insert member 24 is illustrated. The lower insert member 22 includes a central portion 50 that contains a circular aperture 52, a circular aperture 54 and a rectangular aperture 56. The lower insert member 22 includes foldable edges 58, 60, 62, and 64. As illustrated in FIG. 3, the circular aperture 52 is configured to receive and secure the rotor 16 and the circular aperture 54 is configured to receive and secure the subassembly 14 about the stator 28. The rectangular aperture 56 is configured to receive and secure the installation kit 18 about the installation box member 20.

The upper insert member 24 includes a central portion 70 that contains a circular aperture 72 and an aperture 74. The upper insert member 24 includes foldable edges 76, 78, 80 and 82. As illustrated in FIG. 3, the circular aperture 72 is configured to receive and secure the rotor 16 and the aperture 74 is configured to receive and secure the subassembly 14 about the diode end housing assembly 26.

Preferably, the upper and lower insert members 24 and 22 and the box member 12 are constructed from a rigid material such as cardboard to prevent excessive movements of the subassembly 14, the rotor 16 and the installation kit 20. However, as will be apparent to one skilled in the art, the insert members 22 and 24 can be constructed from other suitable materials to prevent excessive movements and possible damage to the kit 10.

Returning to FIGS. 2 and 3, in use the foldable edges 58, 60, 62, and 64 of lower insert member 22 are folded in a manner such that the insert member 22 is inserted in the box member 12 as shown. As best shown in FIG. 3, the edges 58, 60, 62, and 64 contact a lower surface 90 of the box member 12 such that the central portion 50 is supported a distance above the lower surface 90. Next, the 50 DN generator subassembly 14 is disposed within the aperture 54, the rotor 16 is disposed within the aperture 52 and the installation kit is disposed within the aperture 56. Next, the foldable edges 76, 78, 80, and 82 of upper insert member 24 are folded in a manner such that the insert member 24 is inserted in the box member 12 as shown. the aperture 72 receives and secures the rotor 16 and the aperture 74 receives and secures the subassembly 14 about the diode end housing assembly 26.

The central portions 50 and 70 of the lower and upper insert members 22 and 24 have dimensions such that the members 22 and 24 fit securely within the box member 12. This is illustrated in FIG. 3 with edges 78 and 60 contacting inner surface 42 and edges 82 and 64 contacting inner surface 40. Additionally, foldable edges 76 and 58 contact a back surface 43 of the box 12. In a similar manner, the foldable edges 80 and 62 of inserts 24 and 22 contact a front surface of box 12. It is important to note that all of the foldable surfaces of the inserts 22 and 24 do not need to contact edges of the box member 12 to be effective in securing the kit 10. The test sheet 44 is shown disposed on the central portion 70 the upper insert 24, but the test sheet 44 can be located in other locations such as but not limited to anywhere within or outside the box member 12 or within the installation kit box member 20. Lastly, a top 90 of the box member 12 is sealed with an appropriate means to protect its contents.

In order to use the kit 10 to remanufacture a 50 DN generator, an individual simply opens the top 90 and removes the test sheet 44 to verify the actual output specifications that the resulting remanufactured 50 DN generator should attain. Next, the upper insert member 24 is removed allowing access to the subassembly 14, the rotor 16 and the installation kit 18 as deemed necessary during the remanufacturing assembly process.

From the foregoing, it can be seen that compared to piece part kits, the 50 DN remanufacturing kit 10 of the present invention minimizes the assembly functions and labor time required to remanufacture a 50 DN generator because the kit 10 utilizes the pre-assembled 50 DN generator subassembly 14 in combination with the rotor 16 and installation kit 18. As such, the number of assembly steps that must be performed during the remanufacturing process is greatly reduced. An additional advantage of the present invention is that the 50 DN generator assembly 14 and the rotor 16 are pre-tested such that the resulting remanufactured 50 DN generator meets output specifications as indicated on the test sheet 44.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. A 50 DN generator remanufacturing kit, comprising:
   a box member;
   a 50 DN generator subassembly; and
   an insert structure for securing the 50 DN generator subassembly within the box member, the insert structure including a lower insert member disposed transversely across a lower section of the box member, and an upper insert member disposed transversely across an upper section of the box member.

2. The kit of claim 1, further comprising:
   a rotor secured by the insert structure within the box member.

3. The kit of claim 2, further comprising:
   a test sheet including actual electrical output results from the 50 DN generator subassembly tested with the rotor.

4. The kit of claim 1, further comprising:
   an installation kit secured by the insert structure within the box member.

5. The kit of claim 1, wherein the 50 DN generator subassembly includes:
   a diode end housing assembly;
   a stator coupled to the diode end housing assembly; and
   a field coil disposed within the stator and coupled to the diode end housing assembly.

6. A 50 DN generator remanufacturing kit, comprising:
   a box member;
   a 50 DN generator subassembly;
   a rotor configured to operate with the 50 DN generator subassembly, wherein the rotor and the 50 DN generator subassembly are pretested as an operating unit;
   a lower insert member disposed transversely across a lower section of the box member and including apertures for receiving the rotor and the 50 DN generator subassembly; and
   an upper insert member disposed transversely across an upper section of the box member and including apertures for receiving the rotor and the 50 DN generator subassembly.

7. The kit of claim 6, wherein the lower insert member includes:
   a central portion with the apertures; and
   at least two foldable edge sections for supporting the central portion a predetermined distance from a bottom surface of the box member.

8. A 50 DN generator remanufacturing kit, comprising:
   a box member;
   a 50 DN generator subassembly;
   a rotor;
   an installation kit;
   a lower insert member disposed transversely across a lower section of the box member for securing the 50 DN generator subassembly, the rotor, and the installation kit within the box member; and
   an upper insert member disposed transversely across an upper section of the box member for securing the 50 DN generator subassembly and the rotor with the box member.

9. The kit of claim 8, wherein the lower insert member includes a central portion with apertures for receiving the installation kit, the rotor and the 50 DN generator subassembly, and wherein the upper insert member includes apertures for receiving the rotor and the 50 DN generator subassembly, whereby the lower and the upper insert members secure the installation kit, the 50 DN generator subassembly, and the rotor within the box member.

10. The kit of claim 8, wherein the 50 DN generator subassembly includes:
    a diode end housing assembly;
    a stator coupled to the diode end housing assembly; and
    a field coil disposed within the stator and coupled to the diode end housing assembly.

11. The kit of claim 8, further comprising:
    a test sheet including actual electrical output results from the 50 DN generator subassembly tested with the rotor.

12. The kit of claim 8, wherein the lower insert member includes:
   a central portion with a plurality of apertures for receiving the 50 DN generator subassembly, the rotor, and the installation kit; and
   at least two foldable edge sections for supporting the central portion a predetermined distance from a bottom surface of the box member such that the 50 DN generator subassembly, the rotor, and the installation kit are secured within the box.

13. An apparatus for remanufacturing a 50 DN generator, comprising:
   (a) a box member;
   (b) a 50 DN generator subassembly, the subassembly including:
      (1) a diode end housing assembly;
      (2) a stator coupled to the diode end housing assembly; and
      (3) a field coil disposed within the stator and coupled to the diode end housing assembly;
   (c) a rotor;
   (d) an installation kit;
   (e) a lower insert member disposed transversely across a lower section of the box member for securing the 50 DN generator subassembly, the rotor, and the installation kit with the box member; and
   (f) an upper insert member disposed transversely across an upper section of the box member for securing the 50 DN generator subassembly and the rotor with the box member, whereby the lower and the upper insert members secure the 50 DN generator subassembly, the rotor, and the installation kit within the box member and allow removal of the 50 DN generator subassembly, the rotor, and the installation kit for use in remanufacturing the 50 DN generator.

14. The apparatus of claim 13, further comprising:
   a test sheet including actual electrical output results from the 50 DN generator subassembly tested with the rotor.

15. The apparatus of claim 13, wherein the lower insert member includes:
   a central portion with the apertures for receiving the installation kit, the rotor and the 50 DN generator subassembly; and
   at least two foldable edge sections for supporting the central portion a predetermined distance from a bottom section of the box member.

16. The apparatus of claim 15, wherein the upper insert member includes apertures for receiving the rotor and the 50 DN generator subassembly, whereby the lower and upper insert members secure the installation kit, 50 DN generator subassembly, and rotor within the box member.

17. The apparatus of claim 13, wherein the installation kit includes:
   a second box member for encapsulating at least a first and a second bearing member.

18. A 50 DN generator remanufacturing kit, comprising:
   a box member;
   a 50 DN generator subassembly;
   a rotor configured to operate with the 50 DN generator subassembly to generate an electrical output, the rotor and the 50 DN generator subassembly being electrically pre-tested together to determine that the rotor and the 50 DN generator subassembly as an operating unit meet a predetermined electrical output specification; and
   an insert structure for securing the 50 DN generator subassembly and the rotor within the box member.

19. The kit of claim 18 wherein the rotor and the 50 DN generator subassembly are mechanically pre-tested together to determine that the rotor and the 50 DN generator subassembly as an operating unit meet a predetermined mechanical specification.

20. The kit of claim 18, wherein the insert structure includes:
   a lower insert member disposed transversely across a lower section of the box member and including apertures for receiving the rotor and the 50 DN generator subassembly; and
   an upper insert member disposed transversely across an upper section of the box member and including apertures for receiving the rotor and the 50 DN generator subassembly.

21. The kit of claim 18, wherein the 50 DN generator subassembly includes:
   a diode end housing assembly;
   a stator coupled to the diode end housing assembly; and
   a field coil disposed within the stator and coupled to the diode end housing assembly.

22. The kit of claim 18, further comprising:
   a test sheet including actual electrical output results from the 50 DN generator subassembly tested with the rotor.

23. The kit of claim 18, further comprising:
   an installation kit secured by the insert structure within the box member.

24. The kit of claim 23 wherein the installation kit includes at least one bearing.

25. A generator remanufacturing kit, comprising:
   a box member;
   a generator subassembly;
   a rotor configured to operate with the generator subassembly to generate an electrical output, the rotor and the generator subassembly being pre-tested together to determine that the rotor and generator subassembly as an operating unit meet a predetermined specification; and
   an insert structure for securing the generator subassembly and the rotor within the box member.

26. The kit of claim 25, wherein the insert structure includes:
   a lower insert member disposed transversely across a lower section of the box member and including apertures for receiving the rotor and the generator subassembly; and
   an upper insert member disposed transversely across an upper section of the box member and including apertures for receiving the rotor and the generator subassembly.

27. The kit of claim 25, wherein the generator subassembly includes:
   a diode end housing assembly;
   a stator coupled to the diode end housing assembly; and
   a field coil disposed within the stator and coupled to the diode end housing assembly.

28. The kit of claim 25, further comprising:
   a test sheet including actual electrical output results from the generator subassembly tested with the rotor.

29. The kit of claim 25, wherein the predetermined specification is a predetermined electrical output specification.

30. The kit of claim 25, wherein the predetermined specification is a predetermined mechanical specification.

31. A 50 DN generator remanufacturing kit, comprising:
   a box member;
   a 50 DN generator subassembly;
   an insert structure for securing the 50 DN generator subassembly within the box member; and
   a test sheet including actual electrical output results from the 50 DN generator subassembly.

32. The kit of claim 31, further comprising a rotor secured by the insert structure within the box member, and wherein the test sheet includes actual electrical output results from the 50 DN generator subassembly tested with the rotor.

33. A 50 DN generator remanufacturing kit, comprising:
   a box member;
   a 50 DN generator subassembly;
   an insert structure for securing the 50 DN generator subassembly within the box member; and
   an installation kit secured by the insert structure within the box member, wherein the installation kit includes at least one bearing.

* * * * *